United States Patent [19]

Wada et al.

[11] 4,076,354

[45] Feb. 28, 1978

[54] METHOD FOR CONDITIONING AN EDGE OF AN INTERNAL ELECTRIC CONDUCTIVE FILM OF A CATHODE RAY TUBE

[75] Inventors: Masamichi Wada, Otsu; Isamu Nakagawa, Oumihachiman; Hiroshi Mizoguchi, Otsu, all of Japan

[73] Assignee: Nippon Electric Glass Company, Limited, Japan

[21] Appl. No.: 732,450

[22] Filed: Oct. 14, 1976

[30] Foreign Application Priority Data

Oct. 17, 1975 Japan ................................ 50-125532

[51] Int. Cl.[2] ................................................ H01S 9/00

[52] U.S. Cl. .......................................... 316/1; 316/26

[58] Field of Search ................ 316/1, 22, 26; 29/25 H

[56] References Cited

U.S. PATENT DOCUMENTS

| | | | |
|---|---|---|---|
| 3,323,854 | 6/1967 | Palac | 316/1 |
| 3,434,770 | 3/1969 | Angelucci et al. | 316/1 |

*Primary Examiner*—Richard B. Lazarus

*Attorney, Agent, or Firm*—Kurt Kelman

[57] ABSTRACT

A D.C. voltage is applied between an anode terminal and stem pins of a cathode ray tube, using the anode terminal as a negative terminal to cause cathode spot at an edge of an internal electric conductive film of the cathode ray tube. Thus, the edge of the internal electric conductive film is so conditioned that the dielectric breakdown strength of a glass neck tube of the cathode ray tube is graded up.

6 Claims, 6 Drawing Figures

METHOD FOR CONDITIONING AN EDGE OF AN INTERNAL ELECTRIC CONDUCTIVE FILM OF A CATHODE RAY TUBE

BACKGROUND OF THE INVENTION

This invention relates to a method for grading up the dielectric breakdown strength of a glass neck tube of a cathode ray tube (CRT).

It has been known that the dielectric breakdown strength of a dielectric or insulator material, such as glass, varies correspondingly to various conditions at a time when a high voltage is applied to the material. The edge effect of an electrode mounted on the dielectric material is one of the functions that remarkably degrade the dielectric breakdown strength of the dielectric material. The edge effect is thought to be based on the fact that the electric field concentrates on the edge of the electrode.

As well known in the art, a CRT has an internal electric conductive film of graphite or an aquadag, which is a mixture of graphite fine powder and water glass, which is applied on the internal side surface of a glass funnel of the CRT and extends to an internal surface of a glass neck tube to terminate an edge thereof.

In the neck tube, an electron gun is contained, and one of electrodes of the gun is electrically connected to the internal electric conductive film through metal springs which support the gun within the neck tube. The other electrodes of the gun are connected to stem pins which are mounted on an end of the neck tube for electrical connection with a peripheral circuit. The internal electric conductive film is electrically connected to an anode terminal which is mounted in the side wall of the funnel.

In use, a D.C. high voltage for example, 30 KV, is applied to one of electrode of the gun through the internal electric conductive film and the anode terminal.

It is desirable to elevate the D.C. high voltage applied to the anode terminal in order to improve the brightness of the image developed on the viewing screen of the CRT.

But it is experientially known that the higher the D.C. voltage applied to the anode terminal is, the more often dielectric breakdown of the neck tube is caused near the edge of the internal electric conductive film.

When the outside surface of the neck tube is electrically grounded, the concentration of the electric field at the edge of the internal electric conductive film is promoted so that the dielectric breakdown of the neck tube may be caused in a direction of the thickness of the glass wall of the neck tube.

While in use in a high humidity condition, the outside surface of the neck tube of the CRT may be effectively brought into a grounded condition. In a TV set having an electronic channel selector, it is desired that the outside surface of the neck tube is electrically grounded in order to ensure the unerring operation of the selector.

Accordingly, it is desired to grade up the dielectric breakdown strength of the glass neck tube of the CRT.

SUMMARY OF THE INVENTION

A general object of this invention is to provide a CRT having a glass neck tube with an improved dielectric breakdown strength.

Another object of this invention is to provide a method for conditioning the edge of an internal electric conductive film of the CRT to grade up the di-electric breakdown strength of the neck tube.

The, method for conditioning the internal electric conductive film of the CRT according to this invention is characterized in that the stem pins of the CRT are commonly grounded and applied a high enough negative D.C. voltage is applied to the anode terminal develop cathode spots at the edge of the internal electric conductive film of the CRT.

According to an aspect of the invention the negative voltage is elevated at a rate of 0.5 KV/sec. to 40 KV and is maintained at that voltage. Thereafter the application of that negative voltage for 0.2 seconds interrupted for 1.0 second, is repeated over three minutes.

The outside surface of the neck tube may be grounded at a corresponding portion of the edge of the internal electric conductive film. In that case, negative D.C. voltage of 10 KV is applied to the anode terminal to develop cathode spots for one minute.

Further objects and features of this invention will be understood from the following description of a preferred embodiment of this invention referring to the annexed drawings.

DETAILED DESCRIPTION OF THE PREFERRED EMBODIMENT

Colour television tubes of 20 inches and 90° of an inline type were subjected to dielectric breakdown tests of neck tubes thereof at a portion corresponding to the edge of the internal electric conductive film. The tests were carried out by a circuit such as shown in FIG. 1, except that the polarity of the D.C. source connected to the anode terminal of the tube is positive in the measuring circuit.

Figure 1:
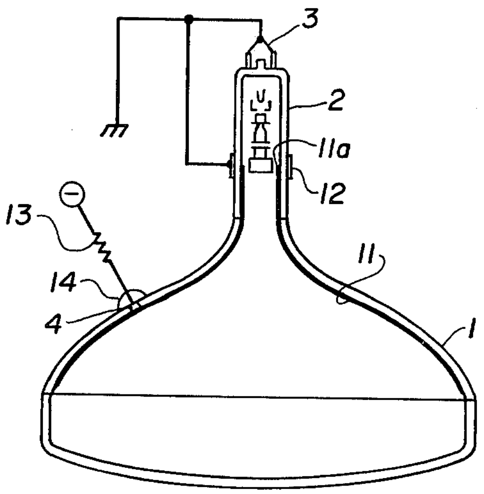
FIG. 1 shows a circuit diagram which is employed for carrying out the conditioning process, this figure also being utilized to describe a circuit for measuring the dielectric breakdown strength of the neck tube of the CRT.

Referring to FIG. 1, an electric conductive film consisting of an aquadag which is available in commerce under the name of HITAS OLGA-37, is applied on the outside surface of the neck tube 2 at a peripheral portion corresponding to the edge 11*a* of the internal electric conductive film 11 of the CRT 1, as an electrode 12. The additional electrode 12 and stem pins 3 are commonly grounded. In the breakdown tests, the anode terminal 4 was connected to the positive electrode of a D.C. high voltage source through a resistor 13 of 10 MΩ reversely to the polarity shown in FIG. 1 for the conditioning process. The anode terminal 4 was coated with a silicone resin 14 to prevent a spark discharge at the outer surface of the terminal. The applied voltage was elevated at a rate of 2 KV/sec. The voltage at which the neck tube 2 was broken down was measured as a dielectric breakdown voltage.

Figure 2A:
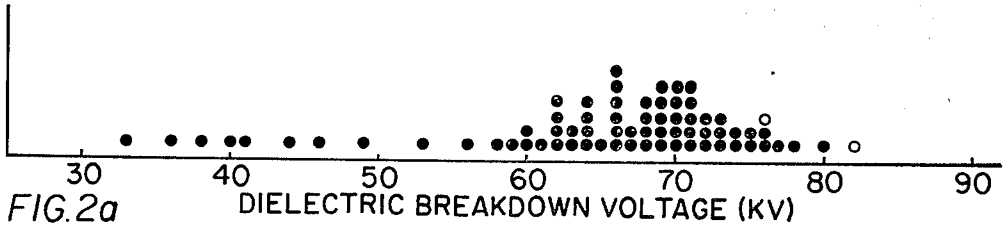
FIGS. 2*a* and 2*b* show results of dielectric breakdown tests, FIG. 2*a* showing those of TV tubes which are not treated by this invention, and FIG. 2*b* showing those of TV tubes which are subjected to the treatment of this invention.

The measured results are shown in FIG. 2*a* wherein black points represent dielectric breakdown voltages of respective tested CRTs. White round points represent voltages of the tested CRTs at which the spark discharges were caused above the tests were stopped.

As will be noted from FIG. 2*a*, eight of 73 CRTs (about 11%) were broken down at voltages less than 50 KV. And one of them was broken down at a voltage of 32 KV near the operating voltage of the CRT.

It was found that the dielectric breakdown strength of the neck tube was graded up by applying negative D.C. voltage to the anode terminal of the CRT to cause a cathode spot at the edge of the internal electric conductive film.

A color television tube of 20 inches and 90° was treated as follows, using the circuit of FIG. 1, but ommitting electrode 12. Stem pins 3 of the tube 1 were commonly grounded and a negative D.C. voltage was applied to the anode terminal 4 and, therefore, the internal electric conductive film 11. The voltage of the anode terminal was elevated at a rate of 0.5 KV/sec. to a negative voltage of 40 KV and was maintained at that voltage. Thereafter the application of that negative voltage for 0.2 seconds, interrupted for 1.0 second, was repeated over 3 minutes.

In the course of the voltage elevation, a red spark was observed near the edge 11*a* of the internal electric conductive film at about 10 KV or more and the spark moved or displaced. This spark was observed only when negative voltage was applied to the internal electric conductive film and, therefore, considered as a cathode spot.

Generally, the discharge current by the cathode spot can be recorded on a recorder. The current was observed to reduce during the repetition of the application of the constant negative voltage of 40 KV.

30 colour television tubes which were subjected to the above described treatment were tested according to the above described dielectric breakdown test. The results of the dielectric breakdown test are shown in FIG. 2*b*.

Figure 2B:
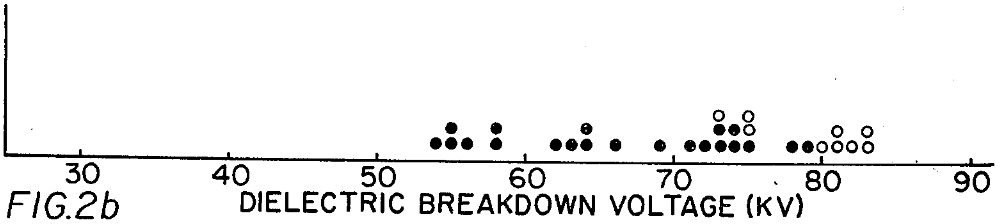

A comparison between FIG. 2*a* and FIG. 2*b* shows that the treatment of this invention grades up the dielectric breakdown strength of the neck tube of CRT.

The effect of the treatment of this invention is thought to be due to the fact that a portion or portions of the edge of the internal electric conductive film on which the electric field concentrates are rounded. And the fact was confirmed by the following experiments.

Figure 3:
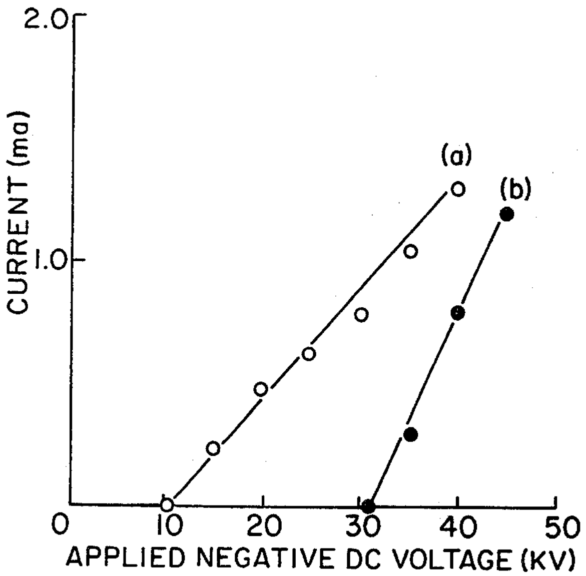
FIG. 3 shows a relation of current to voltage due to the presence of the cathode spot.

Stem pins of a colour TV tube of 20 inches and 90° (of an inline type) were commonly grounded, and the voltage applied to the anode terminal was elevated at a rate of 0.5 KV/sec. to a negative voltage of 50 KV. The cathode spot was observed at about 10 KV or more, as shown by a curve (*a*) in FIG. 3. Thereafter, the same tube was subjected to a similar treatment. In the second treatment, the cathode spot was not observed before the voltage applied to the anode terminal was higher than 30 KV (in negative), as shown by another curve (*b*) in FIG. 3. This means that the edge of the internal electric conductive film was conditioned by the treatment of this invention.

In the production of CRTs, a spot knocking treatment has been known for conditioning electrodes of the electron gun and is carried out after the completion of assembly and exhaust. The spot knocking treatment repeatedly applies a positive D.C. voltage of 60–70 KV to the anode terminal in relation to the stem pins. Thus, spark discharges are caused between the electrodes to round any projections on the electrodes. As a result, any spark discharge is prevented between the electrodes in the operation of the CRT.

The treatment of this invention is different from the spot knocking treatment in the application of the D.C. voltage. Moreover the treatment of this invention may be carried out before the spot knocking treatment, or may be carried out after completion of the spot knocking treatment.

Figure 4A:
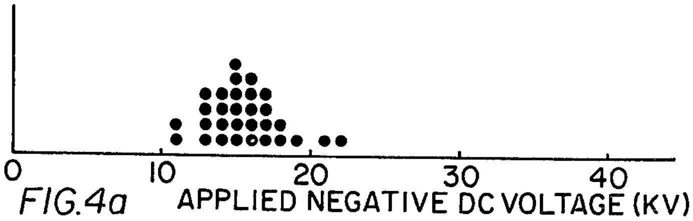
FIGS. 4*a* and 4*b* show distributions of voltages at which cathode spots are caused.
Figure 4B:
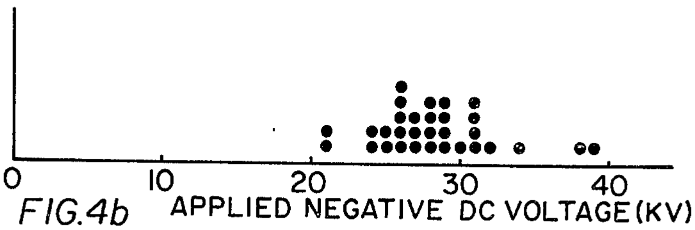

The following experiments were carried out with 30 colour TV tubes of 20 inches and 90° which had already been spot knocking treated. The stem pins of the tube were commonly grounded and the negative voltage was applied to the anode terminal of the tube. The negative voltage was changed at a rate of 0.5 KV/sec. from 0 KV to 40 KV (in negative), and the voltage at which a cathode spot is caused at the edge of the internal electric conductive film was measured. The measured voltages distribute as shown in FIG. 4*a*. The same tubes were subjected to similar treatments. As a result, the voltages at which cathode spot was caused were higher by about 10 KV than the first treatment, as shown in FIG. 4*b*. Accordingly, it will be noted that the dielectric breakdown strength is graded up by the treatment of this invention.

In carrying out the treatment of this invention, an electrode 12 may be additionally provided "on" the outer surface of the neck tube 2 at a peripheral portion corresponding to the edge 11*a* of the internal electric conductive film, as shown in FIG. 1. The additional electrode 12 is grounded commonly to the stem pins. In this case, the spark of the cathode spot is directed to the stem and the conditioning effect is promoted.

After CRTs were treated by the application of negative D.C. voltage which was changed at a rate of 0.5 KV/sec. from zero to 10 KV (in negative) and then maintained at that voltage during one minute, the voltage at which the cathode spot is caused was elevated similarly as shown in FIG. 4*b*.

As above described, this invention is to condition the edge of the internal electric conductive film of the CRT by causing cathode spot at the edge using the edge as a cathode.

We claim:

1. A method for conditioning an edge of an internal electric conductive film of a cathode ray tube comprising a glass neck tube containing an electron gun, a glass funnel connected with one end of the neck tube, an anode terminal mounted in a side wall of the funnel, the internal electric conductive film being applied on an internal side surface of the funnel and extending to have the edge thereof within the neck tube to give an electrical conduction between an anode electrode of the electron gun and the anode terminal, and stem pins being mounted on the other end of the neck tube for connecting the other electrodes of the electron gun with peripheral circuits, which comprises commonly connecting said stem pins to ground and applying to said anode terminal a negative D.C. voltage high enough to cause cathode spot at said edge of said internal electric conductive film until the edge is conditioned and the electric breakdown strength of the glass neck tube is thereby graded up.

2. The method as claimed in claim 1, wherein the negative voltage is changed from zero to 40 KV at a rate of 0.5 KV/sec.

3. The method as claimed in claim 1, wherein the negative voltage is changed from zero to 50 KV at a rate of 0.5 KV/sec.

4. The method as claimed in claim 1, wherein an additional electrode is provided on an outer surface of the neck tube at a peripheral portion corresponding to the edge of the internal electric conductive film, the additional electrode being grounded commonly to the stem pins.

5. The method as claimed in claim 4, wherein the negative voltage is changed form zero to 10 KV at a rate of 0.5 KV/sec.

6. The method as claimed in claim 3, wherein the negative 40 KV voltage is applied for intervals of 0.2 seconds, interrupted for 1.0 second, for 3 minutes.

* * * * *